United States Patent [19]

Bulle et al.

[11] Patent Number: 4,581,908
[45] Date of Patent: Apr. 15, 1986

[54] TRAILER HITCH LOCK

[76] Inventors: Marshall R. Bulle, 917 2nd St., Farmington, Minn. 55024; Dale A. Johnson, 6336-19th Ave. S., Richfield, Minn. 55423

[21] Appl. No.: 627,974

[22] Filed: Jul. 5, 1984

[51] Int. Cl.⁴ ............................................. E05B 73/00
[52] U.S. Cl. ......................................... 70/58; 70/169; 70/258; 280/507
[58] Field of Search ..................... 70/57, 58, 258, 163, 70/166–169; 280/507, 511

[56] References Cited

U.S. PATENT DOCUMENTS

| | | | |
|---|---|---|---|
| 2,732,223 | 1/1956 | Deebel | 280/512 |
| 3,233,913 | 2/1966 | Brown | 70/258 |
| 3,237,969 | 3/1966 | Geresy | 280/507 |
| 3,410,580 | 11/1968 | Longenecker | 208/507 |
| 3,434,741 | 3/1969 | Grant, Jr. | 70/58 |
| 3,526,110 | 9/1970 | Foote | 70/258 |
| 3,780,546 | 12/1973 | Longenecker | 70/58 |
| 4,291,557 | 9/1981 | Bulle et al. | 70/58 |

FOREIGN PATENT DOCUMENTS 2510482  9/1976  Fed. Rep. of Germany .......... 70/58

*Primary Examiner*—Kenneth J. Dorner
*Assistant Examiner*—Lloyd A. Gall
*Attorney, Agent, or Firm*—Donald A. Jacobson

[57] ABSTRACT

A lock has a base with lip extensions which fit about the flange extensions of a ball hitch receptacle to cover the ball receptacle opening. The base is secured by a spring loaded latch having a ramp-shaped upper surface which is forced downward by a flange of the ball receptacle bearing against the ramp when the lock is installed to spring upward within the receptacle when the latch clears the flange where it opposes the removal of the receptacle. The latch also extends downward through a slot in the base part which has a downward projection where the latch is pivotably connected. A hole in the downward extension of the latch can receive the shackle of a padlock to secure the latch fixed to the base projection which holds the upward latch extension within the ball connector to prevent the removal of the lock from the connector. The lock is removed by first removing the padlock and then by pulling the latch downward by its downward extension while simultaneously sliding the lock clear of the ball connector.

3 Claims, 6 Drawing Figures

TRAILER HITCH LOCK

BACKGROUND OF THE INVENTION

I. Field of the Invention

This invention relates generally to locking mechanisms and relates particularly to an apparatus which blocks access to the ball receptacle of a trailer hitch to prevent unauthorized use of the trailer.

II. Description of the Prior Art

There are a number of locks made to block access to the ball receptacle of a trailer hitch to prevent unauthorized use of the trailer. In Grant U.S. Pat. No. 3,434,741 a pair of hinged plates each having a channel to receive the side flanges on a trailer hitch are secured together over the receptacle opening by a padlock secured through a right angle projection from each channel. In Longenecker U.S. Pat. No. 3,780,546 a cover member which covers the bottom of the trailer hitch ball receptacle is held in place by securing a padlock through a proper sized opening in front of the receptacle to prevent the removal of the cover.

In Bulle et al U.S. Pat. No. 4,291,557 a cover is secured over the bottom of a trailer hitch ball receptacle over the flanges of the hitch and held in place by a spring loaded bolt which retracts during the attachment but is held within the ball cavity after attachment by a spring to secure the lock in place. The latch is retracted by a key acting through a cam to remove the lock.

In Longenecker U.S. Pat. No. 3,410,580 a cover which completely encloses the end of a trailer hitch ball receptacle is secured tightly in place by a threaded screw in a cavity which is extended to bear against the top outer portion of the ball receptacle. Access to the screw is denied by a lock mechanism which mates with the cavity and couples with a projection in the cavity. The lock is removed by a key which disengages the lock mechanism to gain access to the screw for removal.

In Geresy U.S. Pat. No. 3,237,969 a first plate member is secured to the flanges on a trailer hitch over the ball receptacle by means of matching U-shaped cross-sections and held in place by a second plate member which is pivotally connected to the first having a curved projection which protrudes through a matching curved hole in the plate into the lower portion of the ball receptacle. A U-shaped projection secured to the bottom projects through a hole in the second plate member. A padlock through the U-shaped projection holds the two plates together with the projection in the ball receptacle preventing removal of the plates which block access to the receptacle and unauthorized use of the trailer.

My present device provides a locking function which is simple to attach merely requiring that the lock be slid over the end of the ball receptacle to attach the lock in place. This attachment automatically positions a spring loaded latch within the connector where it can be secured in this position by a padlock to complete the locking function.

SUMMARY OF THE INVENTION

An anti-theft lock device is secured to a ball connector trailer hitch to obstruct access by the ball and prevent unauthorized use of the trailer. The device consists of two major parts, a base and a latch. The open end of the ball connector which receives the ball is covered by the lock base which is secured to the connector by a lip which encloses the side flange of the connector. A spring loaded latch is pivotably connected through a slot in the base and in a downward projection from the base by a pin through the projection. The latch is sized and situated such that when the lock is slidably mounted on the connector it will cover the ball receptacle area. The latch has a ramp-shaped upper surface and an outward and downward projection below the extension from the pivot point. The lock is attached to the connector by aligning the lip openings on the top of the lock base with the side flanges of the connector base and then sliding the lock over the connector end. The ramp shape of the latch permits the connector flange to force the latch below the connector when the lock is attached to the connector. The latch springs upward within the connector when it clears the flange. The end of the latch adjacent the connector is essentially perpendicular and bears against the inside of the connector after attachment to prevent removal of the lock. The downward extension contains two holes. One hole receives a padlock shackle. The base downward projection extends beyond this hole such that when a padlock shackle is attached through the hole the downward projection will be enclosed to prevent moving the latch. A second hole near the end of the latch extension permits excessive force to break this extension free before any other parts of the lock are broken. The lock is attached to the connector by aligning the lip openings on the top of the lock base with the latch forced downward under the connector until the latch end has cleared the connector at which time the spring will force the latch within the connector. A padlock shackle is then placed through the first hole in the projection to prevent removing the latch from its position within the connector thereby securing the latch in place which prevents removing the lock. The lock is removed by first removing the padlock then pulling the latch downward free of the connector, using the downward projection of the latch while simultaneously sliding the lock free of the connector. An insert which mates with the lip opening covers both sides of the lip to reduce the interior opening between the lips to provide a size adjustment.

DESCRIPTION OF THE PREFERRED EMBODIMENT

Figure 1:
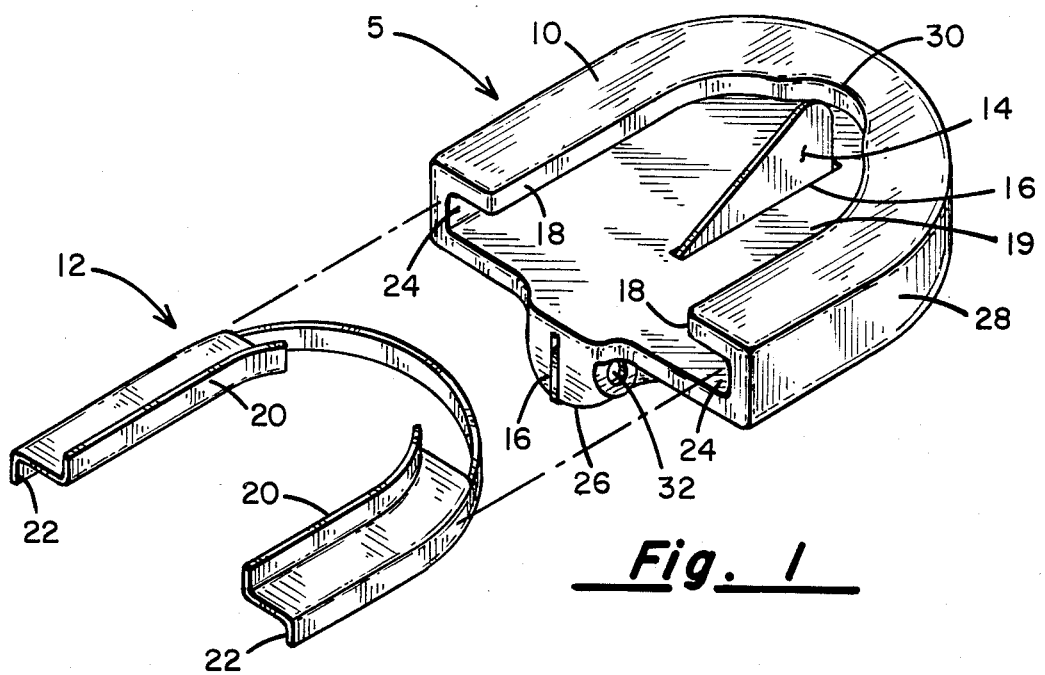
FIG. 1 is an isometric view of the lock and insert aligned for attachment.

All descriptions as to relative location, orientation or rotation are given with respect to the various drawings. Referring to FIG. 1, lock 5 is shown with a body 10 and an insert 12 whose purpose will be described later. A latch 14 used to secure the lock in place, extends through a slot 16 in body 10. Lock 5 has an upper lip 18. Insert 12 has two upward projections 20 on each side and a lower projection 22. Opening 24 of lock 5, which is defined by lip 18, has an interior opening 24 which will receive insert 12 since the lower projection 22 of the insert has the same height as the height of opening 24 and insert 12 has an outer surface of a slightly smaller size than the interior of opening 24 to permit the insert to be contained within the opening. When insert 12 is in place within opening 24, upward extension 20 of the insert extends upward the same distance as the thickness of lip 18 to cover the interior of the lip. The outer edge or side number 28 of body 10 is U-shaped. Upper lip 18 has a circular shaped cut-out 30 which permits latch 14 to be longer, the purpose of which will be described later. With insert 12 in place upward extensions 20 terminate at cut-out 30. Lock 5 has a rounded lower projection 26 which will be described further later.

Figure 2:
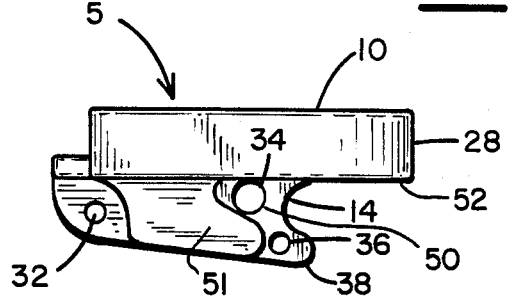
FIG. 2 is a side view of the lock.

In FIG. 2 the shape of projection 26 in side view can be seen along with the shape of the lower portion of latch 14. A pin 32 through aligned holes in both projection 26 and latch 14 pivotably secures the latch in place within projection 26 and body 10 in slot 16. Pin 32 is press fit within the hole in extension 26 with the hole completely through the side visible in the figure and only part way through the opposite side to prevent removal of the pin by a punch. A transverse recess 50 is formed between an extension 51 of base projection 26 and a planar bottom surface 52. A hole 34 through latch 14 is of the proper size to receive the shackle of a padlock. A point 38 spaced from projection 26 extends beyond hole 34 such that the shackle of a padlock through hole 34 will prevent moving latch 14 with respect to body 10. A hole 36 through latch 14 is of the proper size that if an excessive force is exerted on point 38 of the latch the point will break free from the remainder of the latch before any damage is done to pin 32 or the remainder of the latch.

Figure 3:
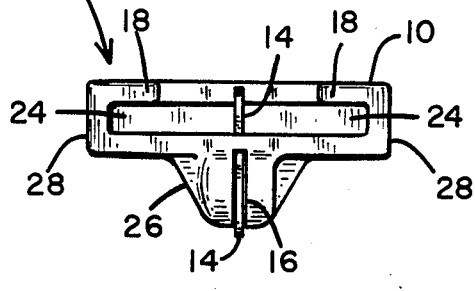
FIG. 3 is an end view of the lock.

In FIG. 3 the shape of projection 26 in end perspective can be seen. The upward extension of latch 14 to a point just below the upper surface of lock body 10 is also shown. The purpose for this upward projection will be described later.

Figure 4A:
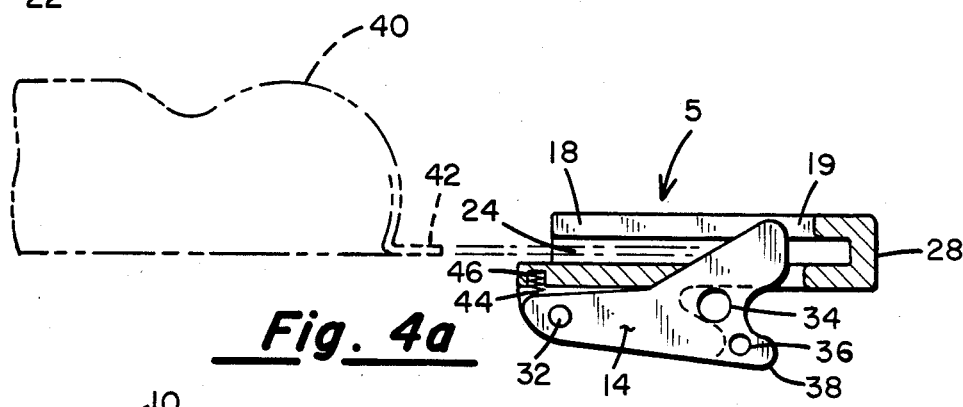
FIG. 4a is a side view of the cross-section through tne center of the lock and trailer hitch with the lock aligned for attachment.

In FIG. 4a a ball hitch receptacle 40 is shown which has a flange 42 extending forward and outward on both sides from the receptacle 40. Lock 5 is shown aligned with ball hitch receptacle 40 in the proper position for attachment to the receptacle. A spring 44 mounted in a cylindrical shaped recess 46 bears against the left end of latch 14 and urges the right end of the latch upward.

Figure 4B:
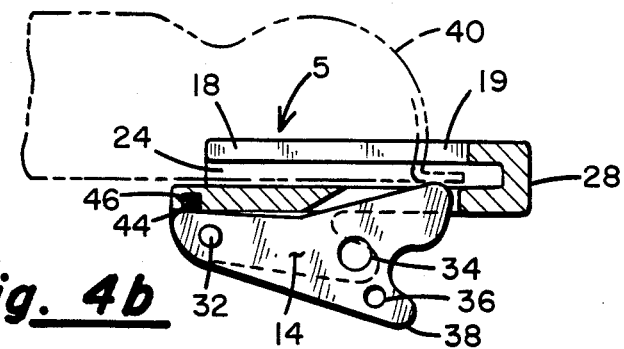
FIG. 4b is the same view of the lock and trailer hitch as FIG. 4a with the lock partially attached.

In FIG. 4b lock 5 is shown in the process of being attached to ball hitch receptacle 40. The side projections of flange 42 are contained within lips 18 while ball receptacle 40 is centered in opening 19. The front end of flange 42 presses downward against latch 14 compressing spring 44 and thus forcing the latch below the flange thereby permitting lock 5 to be attached to receptacle 40.

Figure 4C:
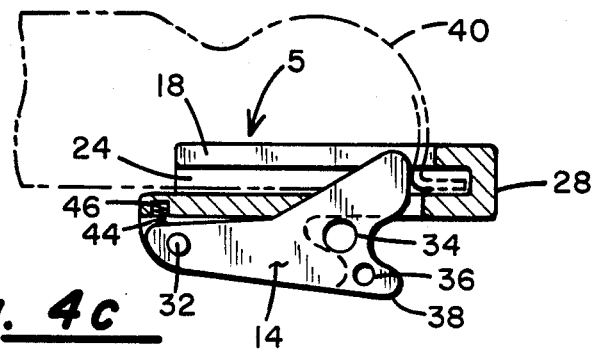
FIG. 4c is the same view of the lock and the trailer hitch as FIG. 4a with the lock attached to the trailer hitch.

In FIG. 4c lock 5 is shown attached to ball hitch receptacle 40. Flange 42 has moved beyond latch 14 permitting spring 44 to return the latch to its position near the upper surface of base 10 which is above the lower surface of lips 18. In this position, the right end of latch 14 bears against the inner surface of receptacle 40 to prevent lock 5 from being removed from the receptacle. The advantage of cut-out 30 permitting latch 14 to be lengthened can be seen here in that the right end of the latch must be curved to clear the right end of slot 16, and a longer latch increases the radius of this curve resulting in an essentially vertical angle of the latch with respect to receptacle 30 at the point of contact. This verticle angle prevents receptacle 40 from depressing latch 14 by being forced against the latch. After lock 5 is attached to receptacle 40 a padlock shackle is inserted through hole 34 to secure the latch 14 in its upper position which prevents the lock from being removed from the receptacle. With lock 5 secured over receptacle 40 a ball cannot be inserted into the receptacle and consequently the hitch cannot be used.

To remove lock 5 the padlock is first removed, latch 14 is then pulled downward using projection 38 while simultaneously sliding the lock clear of connector 40. Lock 5 can be used on a smaller size ball connector by placing insert 12 within opening 24 in the orientation shown in FIG. 1.

Lock body 10 is a metal casting of any desired metal and the remaining parts are made of steel for strength. The lock is a simple design which is inexpensive to manufacture and simple to attach or remove from a connector. No accessory adjusting tools are required in its use. The insert permits a simple reliable size adjustment to permit the lock to be used with two ball sizes.

We claim:

1. For use with a trailer hitch of the type having a ball receptacle surrounded by a laterally extending flange, an improved anti-theft device comprising in combination:

(a) a body having a generally planar bottom surface and an integrally formed arcuate side member extending perpendicularly from said bottom surface, said side member having an integrally formed lip extending inwardly therefrom in a direction generally perpendicular to said side member and parallel and spaced from said bottom surface, said body having one open end for receiving said flange;

(b) an integrally formed base projection depending vertically from said bottom surface in a direction opposite from said side member said base projection terminating in an extension directed outward and away from said open end of said lip, said extension beginning at a predetermined spaced distance from said bottom surface of said body forming a transverse recess greater than the diameter of a padlock shackle and having a width less than the width of a padlock shackle;

(c) a slot extending through said bottom surface of said body and through said base projection perpendicular to said planar bottom surface and generally perpendicular to said open end of said body, and (d) a spring loaded latch pivotably mounted within said slot, the pivot being located within said base projection, said spring arranged to urge said latch through said slot, said latch being shaped such that when it is urged a maximum distance through said slot, a portion extending through said slot is directly opposed to a exposed edge surface of said lip, said latch having a ramp extending upward and away from said pivot point outward of said slot, and terminating in an edge opposite said pivot point which is generally perpendicular to said body, with a portion opposite the pivot extending downward and outward beyond said base projection and into said transverse recess and generally conforming to the shape of said base projection along the portion enclosed by said projection, said latch further having a first hole located above said extension of said base projection of a size to receive a padlock shackle therethrough.

2. The anti-theft device as in claim 1 and further including:

(a) an insert member shaped to pass through said open end and fit between said bottom surface and said lip and generally conforming to said arcuate side member.

3. The anti-theft device as in claim 1 wherein said latch includes means for causing a portion of said latch to fracture at a predetermined location if a predetermined force is applied thereto in an attempt to move said latch when a padlock shackle is in place in said hole.

* * * * *